United States Patent [19]
Barton et al.
[11] 3,914,748
[45] Oct. 21, 1975

[54] ISOLATION-ELEMENT CCD SERIAL-PARALLEL-SERIAL ANALOG MEMORY

[75] Inventors: James B. Barton; Tom F. Cheek, Jr., both of Dallas, Tex.

[73] Assignee: Texas Instruments Incorporated, Dallas, Tex.

[22] Filed: Apr. 29, 1974

[21] Appl. No.: 464,885

[52] U.S. Cl. .................. 340/173 R; 357/24
[51] Int. Cl.$^2$ .................. G11C 11/40
[58] Field of Search ......... 340/173 R, 5 M; 317/234

[56] References Cited

UNITED STATES PATENTS

| | | | |
|---|---|---|---|
| 3,763,480 | 10/1973 | Weimer | 340/173 R |
| 3,772,658 | 11/1973 | Sarlo | 340/173 R |
| 3,797,002 | 3/1974 | Brown | 340/173 R |

*Primary Examiner*—Terrell W. Fears
*Attorney, Agent, or Firm*—Harold Levine; Rene' E. Grossman; Al Bandy

[57] ABSTRACT

A CCD shift register involves a serial input channel and a serial output channel interconnected by a plurality of parallel channels formed in a semiconductor body with separate arrays of multi electrode sets of phase electrodes for receiving alternately isolation element charge packets and information charge packets, overlaying the input, parallel and output channels. A summing gate electrode common to all of the parallel channels is adjacent the output channel. Control means actuates the gate to transfer charge packets from each parallel channel into the output channel and clocks the charge packets to the output. In one aspect, two shift registers are provided with means to inject time samples of an input signal alternately to the two shift registers and to multiplexing the outputs therefrom.

11 Claims, 7 Drawing Figures

ISOLATION-ELEMENT CCD SERIAL-PARALLEL-SERIAL ANALOG MEMORY

This invention relates to a charge coupled device (CCD) in which dispersion and cross talk in analog signals passing therethrough are minimized. In a more specific aspect, charge transfer efficiency is employed as a guide with isolation of charges in CCD serial-parallel-serial analog memory units.

Charge coupled devices in general are well-known. A generalized description thereof is found in "Electronics", June 21, 1971, pages 50 et seq. Details as to construction and operation of a charge coupled device is described in U.S. Pat. No. 3,808,435.

A CCD multiplexer is described and claimed in U.S. application Ser. No. 398,285, filed Sept. 17, 1973.

It is highly desirable to be able to sample and store analog data with no intervening analog-to-digital-to-analog conversion. Sampling a signal at a first rate, storing the analog data and then shifting the data sequentially out of the device at a second rate by a simple clock controlled digital logic circuit has been found to be highly desirable. CCD's possess unique features which permit a new approach to implementation of analog data processing in an integrated circuit form.

The present invention provides the ability in a CCD to store charge packets representative of analog data samples from an input channel with subsequent shifting out of the device serially with no intervening analog-to-digital-to-analog conversion while minimizing dispersion and cross talk.

When surface channel charge coupled devices (CCD) are used as analog devices, charge transfer efficiency (CTE) becomes a critical parameter. Depending on the manner in which the CCD is used, poor CTE can cause dispersion and cross talk. In a serial-parallel-serial (S-P-S) analog memory, two effects can seriously degrade the performance. One degrading effect is due to the serial registers and the other is due to the parallel register.

In accordance with the present invention, a CCD serial-parallel-serial shift register is characterized by a serial input channel and a serial output channel interconnected by a plurality of parallel channels formed in a semiconductor body. Arrays of multi electrode sets of phase electrodes for alternately receiving isolation charge packets or bits and information charge packets or bits overlay the input, parallel and output channels. A summing gate electrode common to all of the parallel channels is then actuated to transfer charge packets into the output channel. The charge packets may then be clocked to the output of the CCD.

In one aspect, the multiple sets of electrodes alternately receive isolation element charge packets and information packets which are subsequently combined at the output to reduce interchannel cross talk.

In another aspect, a dual S-P-S CCD is employed to assure operation in a frequency range when the CTE is high thereby to avoid signal degration.

For a more complete understanding of the invention and for further objects and advantages thereof, reference may now be had to the following description taken in conjunction with the accompanying drawings in which.

Figure 1:
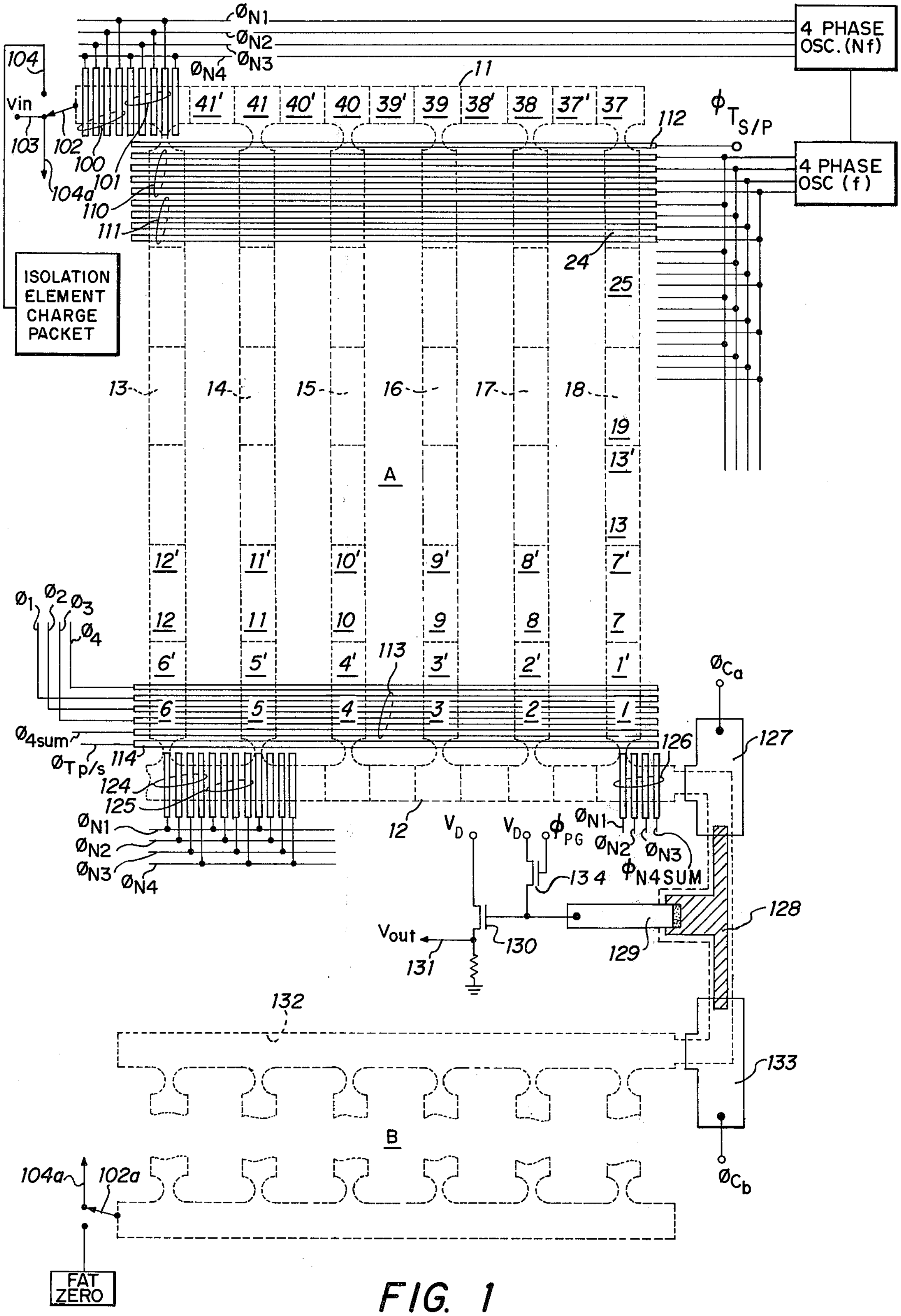
FIG. 1 is a block diagram of an S-P-S, CCD unit.

In FIG. 1 an S-P-S CCD A involves a serial input register 11, a serial output register 12 interconnected by a plurality of parallel registers 13–18. Serial registers 11 and 12 are six element registers as are each of parallel registers 13–18.

Structurally, a CCD may comprise either an n-type or p-type silicon substrate, an MOS-type silicon dioxide insulation layer and an array of metallized electrodes over the insulation layer. In operation, a CCD with a p-type silicon substrate has a first threshold voltage of around −1 to −2 volts applied to the substrate so that a uniform depletion layer forms beneath all electrodes. In a storage mode, a more positive voltage of around 10 volts is applied to an individual electrode creating a deeper depletion layer beneath it thereby spatially defining a potential well. Such a device can receive and store charges. A charge may be injected into the substrate by an input p-n junction. Carriers in p-type silicon are electrons, and since the electrode is positive with respect to the substrate, the electrons are attracted towards the electrode and held in the potential well beneath it. In a transfer mode, the stored charge is shifted along a register by application of a positive voltage greater than 10 volts to an electrode adjacent the electrode on which the 10 volt level is applied. This establishes a well of even greater potential which attracts to it the electrons stored under the first electrode. The voltages are now returned to an initial condition except the electrons have moved one electrode location.

Three-phase CCD structures and four-phase CCD structures have been heretofore implemented and their operation in general is well understood.

The present invention will be described in terms of a four-phase S-P-S CCD. In CCD systems, low CTE gives rise to dispersion of the charge packet when shifted to the output of register 12. Such dispersion appears as cross talk between adjacent charge packets entered at the input to register 11.

In the parallel shift registers 13–18, the effect of low CTE is slightly different. The portion of the charge that is left behind in the parallel registers does not appear in an adjacent charge packet (adjacent in the sense of the input data) but rather in a charge packet that was entered into the CCD N-elements later. For example, in FIG. 1 the CCD is a 6 × 6 element CCD. In such structure, the charge packet of signal sample No. 7 ($N$=1) will receive the portion of the charge left behind by signal sample No. 1.

Both of above CTE effects will affect the performance of an S-P-S analog memory. Depending on the application, these effects can seriously degrade system performance.

Figure 2:
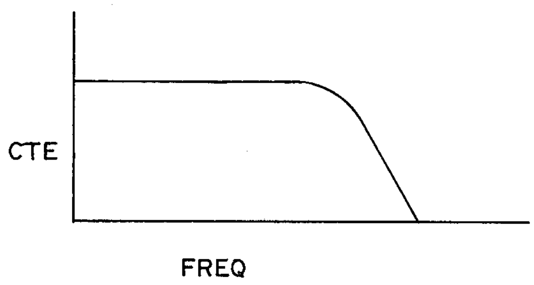
FIG. 2 is a typical relationship between charge transfer efficiency and frequency of operation.

FIG. 2 illustrates a typical relationship between CTE and frequency of operation. CTE decreases rapidly at frequencies above 8 to 10 megahertz in many CCD's. Yet many display systems require effective operation above that frequency.

An S-P-S analog memory typically may be used to store the output from a detector and at a later time the stored analog information forms one horizontal line on a CRT display. The CTE effects of the S-P-S cause reduced performance when displayed on the CRT and are referred to as (1) ghosting and (2) smearing.

The ghost effect is caused by the parallel portion of the S-P-S while the smear effect is produced by the serial portion. A great reduction in ghosting and smearing is achieved as by the present invention.

As to ghosting, incomplete charge transfer of a charge packet in the parallel portion 13–18 (FIG. 1) of an S-P-S analog memory will cause ghosting.

Elimination of ghosting problems is accomplished by adding a set of isolation electrodes to each set of primary electrodes.

In FIG. 1, for example, the serial channel 11 has electrodes connected to lines $\phi_{n1}$, $\phi_{n2}$, $\phi_{n3}$ and $\phi_{n4}$. The system is thus a four phase device. An electrode set 100 forms an isolation set of four electrodes adjacent to the input of the channel 11. Set 101 is a primary set. The channel 11 is alternately connected by way of a gate 102 to the input signal line 103 and to line 104. Channel 11 when connected to line 104 is given an excess negative charge hereinafter referred to as the isolation element charge packet or isolation bit.

The last electrode in set 101 overlies the throat leading to channel 13. Additional sets of isolation electrodes and primary electrodes extend the length of the channel 11 so that isolation and information charge packets may be shifted serially through channel 11 and are thus available to be transferred from channel 11 into channels 13–18.

A set of electrodes 110 spans the parallel channels 13–18 electrodes 111 form a primary. Additional sets of electrodes, like electrodes 110 and 111, extend the length of the channels 13–18 and are connected to lines $\phi_1$–$\phi_4$. The lines $\phi_1$–$\phi_4$ operate at a submultiple of the frequency of the lines $\phi_{n1}$–$\phi_{n4}$. Electrode 112 serves as a transfer electrode to clock isolation and information charge packets from the series channel 11 to the parallel channels on clock $\phi_{Ts/p}$. By this means, the charge packets are then transferred into and thence along the length of channels 13–18. The last set of four electrodes 113 are connected to lines $\phi_1$, $\phi_2$, $\phi_3$, and $\phi_{4sum}$. The last electrode 144, $\phi_{Tp/s}$, is a transfer electrode to shift the charges from the parallel sections 13–18 to the serial section 12.

A set of electrodes 124 span the output channel 12 adjacent to a set of primary electrodes 125. Charge packets in the lower stages of channels 13–18 are thus clocked into the channel 12. The last set of four electrodes 126 on channel 12 comprises electrodes connected to lines $\phi_{n1}$, $\phi_{n2}$, $\phi_{n3}$ and $\phi_{n4}$. Charge packets under the last electrode in set 126 then are transferred under electrode 127 by means of a voltage $\phi_C$ and thence to an output structure 128. An output diode 129 is then connected to deliver charge by way of an output stage comprising FET 130 to an output line 131, the diode being precharged by MOS precharge transistor 134 gated by $\phi_{PG}$ immediately prior to $\phi_C$ and $\phi_C$ .

In the form illustrated in FIG. 1, the structure thus far described comprises one-half of a dual unit in which the second half comprises an identical structure with the output series channel 132 being connected by way of an output electrode 133 to the output diode 129. Electrode 133 is a clocked by way of a voltage $\phi_C$ .

In operation, when the parallel portion 13–18 is fully loaded, sample element No. 1 and its isolation element 1' are located in the first and second rows from the output providing for an isolation charge packet to exist between rows that have primary signal charge packets, i.e., as isolation elements 1', 2' . . . 6'.

Figure 3:
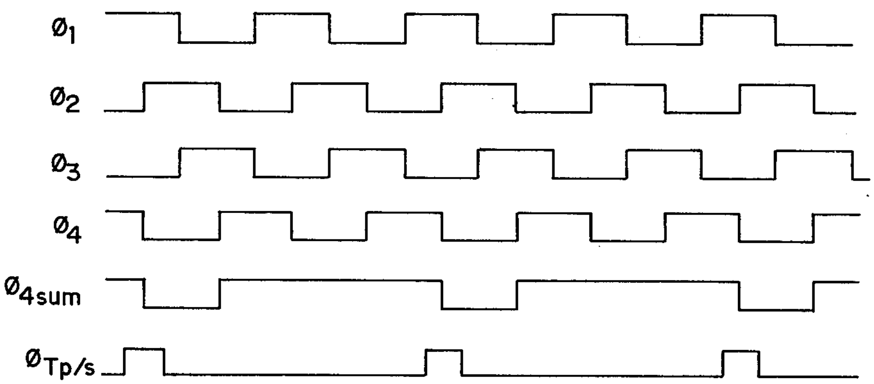
FIG. 3 illustrates timing diagrams for summing primary and isolation charge packets.

Preferably the primary and isolation charge packets are summed before they are shifted to the output shift register 12. This operation shown in FIG. 1 is for a four phase device. The phase voltage waveforms for the parallel shift register are shown in FIG. 3 and correspond with the legends in FIG. 1. The $\phi_{4sum}$ electrode of set 113 is the electrode positioned adjacent to the transfer $\phi_{Tp/s}$ electrode 114 between the parallel register 13–18 and output serial register 12. The waveforms including the voltage $\phi_{4sum}$ are shown in FIG. 3. The $\phi_{4sum}$ voltage is held on for two clock periods, that is, $\phi_{4sum}$ is high while $\phi_4$ is high and while $\phi_4$ is turned on and off twice. This allows the primary and isolation charge packets to be summed under the $\phi_{4sum}$ electrode. $\phi_{4sum}$ electrode preferably will have a larger area in order to allow for the summing of the primary charge packet and the isolation element charge packet a "fat zero" and information charge packet is entered at each of the input serial registers after the parallel transfer and before the next isolation charge packet is entered into the shift register. The "fat zero" compensates the information charge packet for fixed losses occurring in the depletion regions. As—shown in FIG. 1 —additional electrode sets are formed for receiving alternately isolation charge packets and information charge packets. The isolation element charge packet for the isolation elements is entered through gate 102 from line 104, and compensates the system for CTE losses which are proportional to the input voltages.

For the same output rates, both the input serial and parallel shift register have to run at twice the frequency at which they would operate if there were no isolation elements. As previously mentioned, the CTE effects in the output shift register produces smearing. Smearing is virtually eliminated by using the isolation elements illustrated in FIG. 1. In systems where the system is to be compatible with systems such as a standard television display, the unit of FIG. 1 rather than being a 6 × 6 parallel section would be of the order of a 30 × 30 array. The output data rate would be high (≃17.3 MHz). In use of isolation elements in the output serial register, the phase clock frequency would be ≃34.6 MHz.

Figure 4:
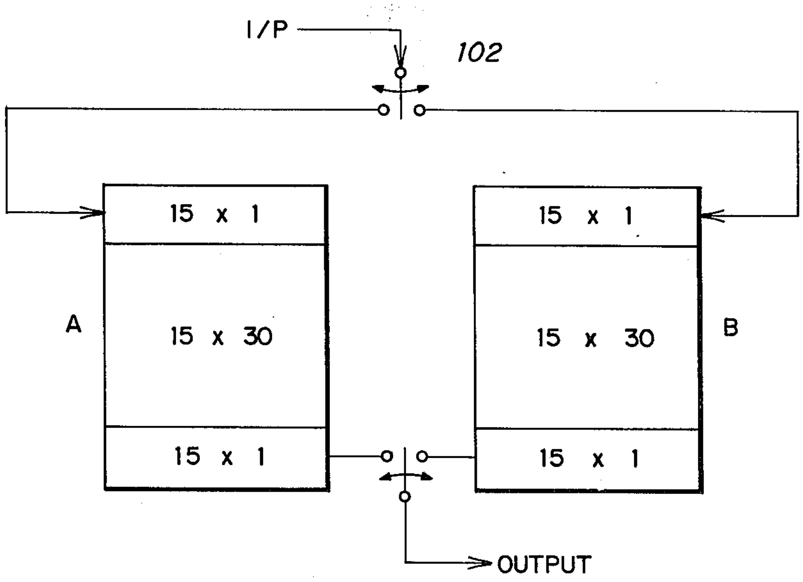
FIG. 4 illustrates the overall arrangement in which CCD units A and B receive alternate input signal samples.

In order to avoid such high frequency operation, a dual isolation element S-P-S CCD is used wherein the companion unit having output channel 132 is employed. FIG. 4 illustrates the overall arrangement in which CCD units A and B receive alternate input signal samples by way of switch 102. The signal samples then pass through the two S-P-S CCD's A and B and are recombined or multiplexed at the output.

In order to be able to commutate the output serial register from units A and B, the primary and isolation charge packets are summed as discussed in connection with operation of electrode $\phi_{4sum}$. The waveforms for the output serial registers are indicated in FIG. 5.

It will be noted that from FIG. 3 the clock pulses $\phi_1$, $\phi_2$, $\phi_3$ and $\phi_4$ are pulses of 180° duration and overlap the preceding and succeeding pulses by 90°. The pulse $\phi_{4sum}$ is of length to encompass one and one-half of the periods of the waveform $\phi_4$. By this means, the contents of the primary cell and the isolation cell, such as cells 1 and 1', FIG. 1, are added for application to output register 12.

Figure 5:
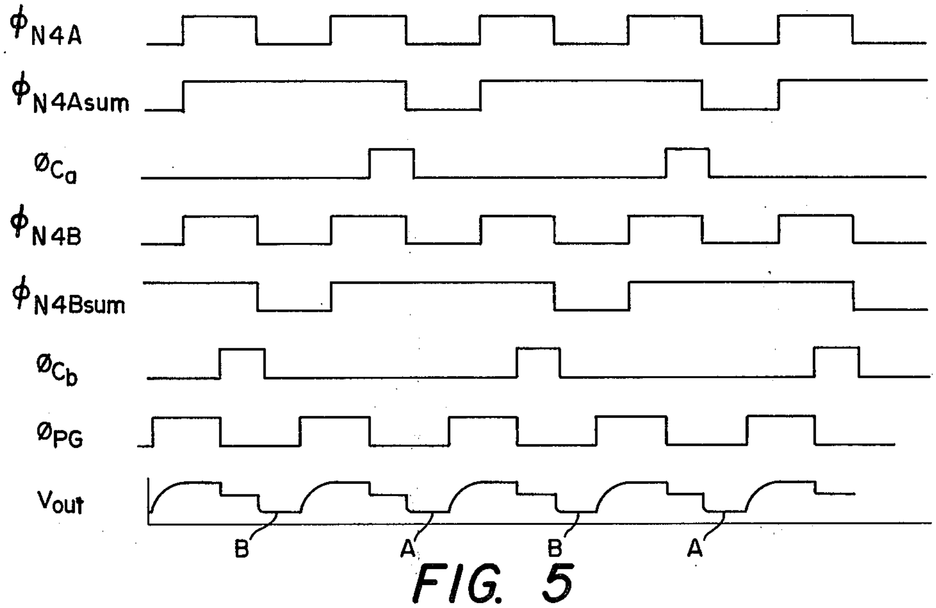
FIG. 5 illustrates the waveforms of the serial outputs of the dual S-P-S structure.

In FIG. 5, the operation of the two units A and B is indicated. The pulses $\phi_{N4Asum}$ and $\phi_{N4Bsum}$ bear the same relationship to the waveforms $\phi_{N4A}$ and $\phi_{N4B}$ as $\phi_{4sum}$ does to $\phi_4$ in FIG. 3. The waveforms $\phi_{ca}$ and $\phi_{cb}$ clock the charges out of the series units 12 and 132 to the output diode 129. The output voltage $V_{out}$ appearing on line 131 then has the appearance indicated in FIG. 5.

In using CCD's to be compatible with standard television signal rates of about 17.3 MHz, the output serial registers 12 operate at this 17.3 MHz frequency rate. In a 4-phase structure as many as $30 \times 4 = 120$ transfers of a charge packet must be made at the 17.3 MHz frequency rate. However, many CCD structures at best have a CTE frequency response that has a break frequency of 8–10 MHz as shown in FIG. 2. Hence a lower valve of CTE occurs at 17.3 MHz rate than at 8 MHz.

The dual S-P-S of FIG. 1 may be a $30 \times 30$ element device divided into two $15 \times 30$ element structures with the output multiplexer between the two structures.

The input signal is demultiplexed into the two $15 \times 1$ arrays by switches 102 and 102*a* of FIG. 1. The stored information is then shifted down to the correct $15 \times 30$ arrays. Upon readout, the stored charge packets are shifted into the output shift registers 12 and 132 and shifted to the end of each register. The output from each register is then multiplexed to form a single channel output.

Figure 6:
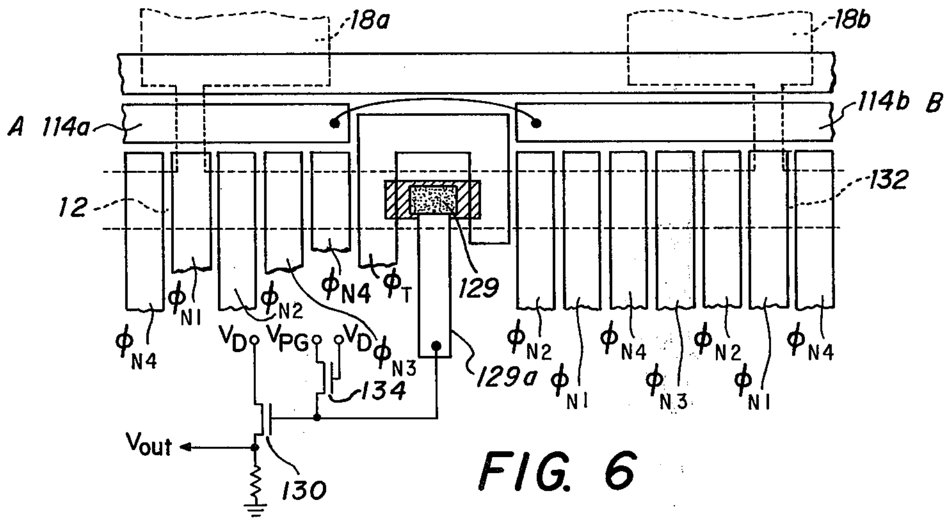
FIG. 6 illustrates the structure ensuring arrival of the charge packets at the output 180° electrical apart.
Figure 7:
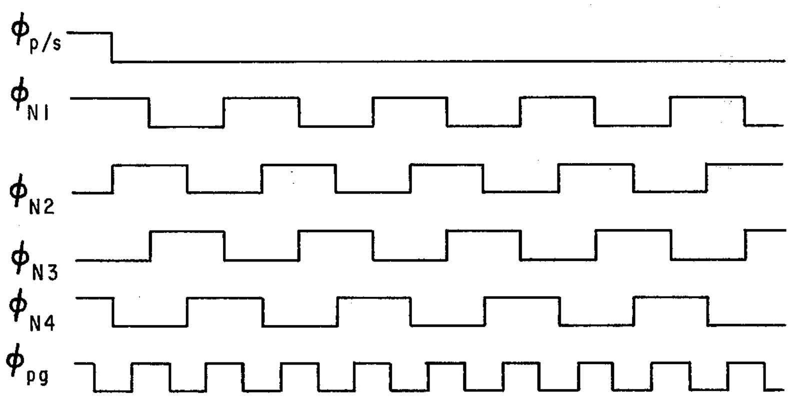
FIG. 7 illustrates output register waveforms of the dual S-P-S structure without the sets of isolation electrodes.

The charge packets forming the two trains arrive at the output diode 129, 180 electrical degrees apart from each of the two registers. Structure used to assure arrival of the packets at the output 180 electrical degrees apart preferably employs two extra electrodes on one of the output shift registers as shown in FIG. 6. For the case where isolation elements are not employed, FIG. 7 illustrates output register waveforms. In FIG. 6 the two output channels 12 and 132 underly output diode 129. Channel 12 underlies electrodes $\phi_{N4}$, $\phi_{N1}$, $\phi_{N2}$, $\phi_{N3}$ and $\phi_{N4}$ in the same array as in FIG. 1. Electrode $\phi_{N1}$ overlays the inlet leading from the last parallel channel 18. Added is transfer electrode $\phi_T$ which is shaped to overlay both channels 12 and 132 to allow the transferring of the packets from the parallel registers to the output serial registers.

Transfer electrodes 114*a* and 114*b* (FIG. 6) serve to clock charge packets from the parallel channels into the series output channel 12-132. Channel 132 underlies electrodes including (from the right side) $\phi_{N4}$, $\phi_{N1}$, $\phi_{N2}$, $\phi_{N3}$ and $\phi_{N4}$ as was the case with channel 12. Electrode $\phi_{N1}$ overlays the inlet leading from the last parallel channel 18*b* in unit B.

Two additional electrodes $\phi_{N1}$ and $\phi_{N2}$ are positioned between the left $\phi_{N4}$ electrode of unit B and an extension of the transfer electrode $\phi_T$ as shown in FIG. 6.

The operation is as follows: Charge packets in the parallel shift registers of units A and B are shifted down into the two output shift registers 12 and 132 at the same time. The parallel transfer gate electrode 114*a*, *b* is gated by $\phi_{TP/S}$ and is common to both of the arrays A and B. The packets are thus positioned in the output shift registers under $\phi_{N1}$ electrodes. The packets are then clocked by the phase electrodes voltage waveforms $\phi_{N1}$, $\phi_{N2}$, $\phi_{N3}$ and $\phi_{N4}$ to the output diode 129. As shown the charge packet in the A unit in the left hand side shift register arrives at the output diode when in an n-channel device $\phi_{N4}$ goes to zero. However, the charge packet from the B unit in the right-hand side electrode does not arrive until the next $\phi_{N2}$ voltage waveform drops to zero. Hence the respective charge packets arrive at the output diode 180° electrical apart and the shift registers 12 and 132 are effectively multiplexed allowing them to run at one-half of the output data rate. The output diode 129 is precharged by the precharge MOS device 134 prior to the arrival of each charge packet. The voltage waveform $\phi_{PG}$ applied to the precharge gate electrode of the MOS transistor 134 is pulsed at the output data rate.

This not only allows the output shift register to operate at one-half the output clock rate, but decreases the maximum number of transfers by one-half in comparison to a single S-P-S CCD of the same output rate.

Where compatability with standard television is an object, the dual multiplexed CCD system shown in FIGS. 1, 4 and 6 may be employed without the isolation electrode arrays so long as the data rate is maintained below the 8–10 megahertz level. High CTE characterizing the lowered data rates permits the elimination of the isolation electrodes.

Thus, the invention involves an S-P-S CCD with isolation electrodes as shown by unit A or unit B of FIG. 1. It involves dual S-P-S CCD's with isolation electrodes as shown in FIG. 1.

It involves dual S-P-S CCD's wherein the system of FIG. 1, the isolation electrode set are eliminated.

Having described the invention in connection with certain specific embodiments thereof, it is to be understood that further modifications may now suggest themselves to those skilled in the art and it is intended to cover such modifications as fall within the scope of the appended claims.

What is claimed is:

1. A charge coupled shift register for handling time sampled analog information input packets comprising:
   a. an isolation element charge packet producing means,
   b. a serial input channel to receive alternately isolation element charge packets from said isolation element charge packet producing means and information packets, and a serial output channel connected to said input channel by a plurality of parallel channels wherein all said channels are formed in a semiconductor body,
   c. arrays of multi electrode sets of phase electrodes insulated from and overlaying said input, parallel and output channels,
   d. an output transfer electrode common to all of the parallel channels,
   e. means to actuate said transfer electrode to transfer charge packets from each parallel channel into said output channel for summation at an information and isolation element charge packet summation rate, and
   f. means to clock the combined charge packets to the output of said output channel.

2. The combination set forth in claim 1 in which said sets of electrodes include electrodes to permit separation of adjacent charge packets by intervening isolation packets while maintaining desired information output level.

3. The combination set forth in claim 1 in which multi phase voltage pulses are applied to said electrodes to transfer said charge packets.

4. The combination set forth in claim 3 in which the rate of said pulses applied to electrodes over said serial channels is high compared to the rate of pulses applied to said parallel channels.

5. The combination set forth in claim 1 in which the electrode arrays overlying said parallel channels comprise electrodes each of which is common to all of said parallel channels.

6. The combination set forth in claim 1 in which means are provided to fix said first rate such that a charge packet is shifted through two sets of said electrodes in said first and second array in each said sample interval and means are provided to detect the charge packets at said output structure with each detected packet comprising a primary bit and an isolation bit.

7. A charge coupled system comprising:

a. a serial-in parallel-out charge coupled shift register defined in a semiconductor substrate wherein each information and isolation bit of said shift register are defined by sets of spaced apart substantially parallel electrodes for alternately receiving an isolation bit and an information bit, b. a set of parallel charge coupled shift registers, one of which is coupled to each information and isolation bit location on said serial-in parallel-out shift register for transfer of bits to said parallel registers, c. a parallel-in serial-out charge coupled shift register connected to receive the information and isolation bits from said parallel shift registers, d. means to clock charges along said registers, e. a transfer electrode to transfer the information and isolation bits from said parallel registers to said parallel-in serial-out register, and f. means to sum each information bit and its isolation bit prior to transfer to said parallel-in serial-out register.

8. A charge coupled system comprising:

a. a serial-in parallel-out charge coupled shift register defined in a semiconductor substrate, each element of said shift register defined by sets of spaced apart substantially parallel electrodes for receiving alternately isolation bits and information bits separated from adjacent elements by sets of like electrodes through which the isolation and information bits are passed, b. a parallel-in serial-out charge coupled shift register connected to receive the bits from said parallel shift registers, c. a transfer electrode for shifting the bits from said parallel registers to said parallel-in serial-out register, and d. a summing electrode adjacent said transfer electrode to sum each information bit and its isolation bit prior to transfer by said transfer electrode to said parallel-in serial-out register.

9. The combination set forth in claim 8 in which said system is formed on a single semiconductor body.

10. The combination set forth in claim 8 in which said registers are surface registers covered by an insulating layer on top of which said sets of electrodes are formed.

11. The combination set forth in claim 8 in which a first clock pulse source is connected to transfer charges along said parallel shift registers and a second clock pulse source is provided to shift charges along said serial shift registers at a rate higher than in said parallel shift registers in proportion to the number of said parallel shift registers.

* * * * *